United States Patent
Uchimoto et al.

(10) Patent No.: US 8,624,828 B2
(45) Date of Patent: Jan. 7, 2014

(54) CONTROL CIRCUIT FOR SWITCHING POWER SUPPLY

(75) Inventors: Daisuke Uchimoto, Kyoto (JP); Hiroki Kikuchi, Kyoto (JP)

(73) Assignee: Rohm Co., Ltd. (JP)

( * ) Notice: Subject to any disclaimer, the term of this patent is extended or adjusted under 35 U.S.C. 154(b) by 184 days.

(21) Appl. No.: 13/090,605

(22) Filed: Apr. 20, 2011

(65) Prior Publication Data

US 2012/0120342 A1  May 17, 2012

(30) Foreign Application Priority Data

Apr. 23, 2010  (JP) ................... 2010-100232

(51) Int. Cl.
*G09G 3/36*  (2006.01)
(52) U.S. Cl.
USPC .......... 345/102; 345/76; 345/77; 345/78; 345/82; 345/87
(58) Field of Classification Search
USPC ............ 345/102, 76, 77, 78, 82, 87
See application file for complete search history.

(56) References Cited

U.S. PATENT DOCUMENTS

| 2005/0087675 A1* | 4/2005 | Ayres ..................... 250/214 R |
| 2008/0136389 A1* | 6/2008 | Uchimoto et al. .......... 323/282 |
| 2008/0170012 A1* | 7/2008 | S et al. ..................... 345/82 |

FOREIGN PATENT DOCUMENTS

JP   2006-114324 A   4/2006

* cited by examiner

*Primary Examiner* — William Boddie
*Assistant Examiner* — Saifeldin Elnafia
(74) *Attorney, Agent, or Firm* — Cantor Colburn LLP

(57) ABSTRACT

A control IC controls a switching power supply configured to supply a driving voltage Vout to one terminal of an LED string to be intermittently driven. In the on period of the LED string, a pulse modulator generates a pulse signal having a duty ratio adjusted such that a detection voltage $V_{LED}$ that corresponds to the output voltage Vout of the switching power supply matches a predetermined reference voltage Vref. A driver drives a switching transistor included in the switching power supply according to the pulse signal. After transition from the on period to the off period, the pulse modulator reduces the duty ratio of the pulse signal over time.

6 Claims, 3 Drawing Sheets

PRIOR ART

CONTROL CIRCUIT FOR SWITCHING POWER SUPPLY

BACKGROUND OF THE INVENTION

1. Field of the Invention

The present invention relates to a light emitting apparatus.

2. Description of the Related Art

In recent years, as a backlight of a liquid crystal panel or as an illumination device, a light emitting apparatus is employed, which is configured using a light emitting element such as an LED (light emitting diode) or the like. FIG. 1 is a circuit diagram which shows an example configuration of a light emitting apparatus according to a comparison technique. A light emitting apparatus 1003 includes multiple LED strings 1006_1 through 1006_$n$, a switching power supply 1004, and a current driving circuit 1008.

Each LED string 1006 includes multiple LEDs connected in series. The switching power supply 1004 boosts an input voltage Vin, and supplies a driving voltage Vout to one terminal of each of the LED strings 1006_1 through 1006_$n$.

The current driving circuit 1008 includes current sources $CS_1$ through $CS_n$ which are respectively provided to the LED strings 1006_1 through 1006_$n$. Each current source CS supplies, to the corresponding LED string 1006, a driving current $I_{LED}$ that corresponds to the target luminance level.

The switching power supply 1004 includes an output circuit 1102 and a control IC 1100. The output circuit 1102 includes an inductor L1, a switching transistor M1, a rectifier diode D1, and an output capacitor C1. The control IC 1100 controls the on/off duty ratio of the switching transistor M1 so as to adjust the driving voltage Vout.

RELATED ART DOCUMENTS

Patent Documents

[Patent Document 1]
Japanese Patent Application Laid Open No. 2006-114324

With such a light emitting apparatus 1003, in some cases, in order to adjust the luminance level of each LED string 1006, a PWM (Pulse Width Modulation) control operation is performed on the driving current $I_{LED}$. Specifically, a PWM controller 1009 of the current driving circuit 1008 generates pulse signals $PWM_1$ through $PWM_n$ each having a duty ratio that corresponds to the luminance level so as to perform a switching control operation on the respective current sources $CS_1$ through $CS_n$. Such a control operation is also referred to as the "burst dimming control operation" or "burst control operation".

SUMMARY OF THE INVENTION

The inventors have investigated such a light emitting apparatus, and has come to recognize the following problems.

The load current (output current) Iout of the switching power supply 1004 is the sum of the LED currents. The PWM driving operation for the LED strings 1006 involves the switching of the load current Iout. A sudden change in the load current Iout means that there is a sudden change in the coil current $I_{L1}$ that flows through the inductor L1. This becomes a cause of acoustic noise (which is also referred to as a "rumbling sound") that occurs in the coil. This noise is within the audible band, which is uncomfortable for the user of the electronic device. It should be noted that the above-described consideration is by no means within the scope of common and general knowledge in the field of the present invention. Furthermore, it can be said that the present applicant has been the first to arrive at this consideration.

The present invention has been made in order to solve such a problem. Accordingly, it is an exemplary purpose of an embodiment of the present invention to provide a control circuit which is capable of suppressing acoustic noise that occurs in the coil in the PWM driving operation.

An embodiment of the present invention relates to a control circuit for a switching power supply configured to supply a driving voltage to one terminal of a light emitting element to be intermittently driven. The control circuit comprises: a pulse modulator configured to generate a pulse signal having a duty ratio adjusted such that a detection voltage that corresponds to the output voltage of the switching power supply matches a predetermined reference voltage in an on period of the light emitting element; and a driver configured to drive a switching element included in the switching power supply, according to the pulse signal. After transition of the light emitting element from the on period to the off period, the pulse modulator reduces the duty ratio of the pulse signal over time.

With such an embodiment, the length of the on period of the switching element is reduced over time immediately following transition from the on period to the off period. Thus, such an arrangement is capable gradually reducing the coil current, thereby reducing acoustic noise that occurs in the coil.

Also, the pulse modulator may comprise: a feedback terminal via which a phase compensation capacitor and a phase compensation resistor are to be connected; an error amplifier configured to generate a current that corresponds to the difference between the detection voltage and the reference voltage, and to supply the current thus generated to the feedback terminal, in the on period of the light emitting element; a pulse generator configured to receive a voltage that occurs at the feedback terminal, and to generate a pulse signal having a duty ratio that corresponds to the voltage thus received; and a soft-off circuit configured to change the voltage to be input to the pulse generator such that the duty ratio of the pulse signal is reduced after transition of the light emitting element from the on period to the off period.

The pulse generator may be configured as a pulse width modulator, or may be configured as a pulse voltage modulator.

Also, the soft-off circuit may comprise: a soft-off capacitor arranged between an input terminal of the pulse generator and a fixed voltage terminal, and configured to be charged by a voltage that occurs at the feedback terminal in the on period; and a discharge circuit configured to discharge the soft-off capacitor in the off period.

Also, the discharge circuit may be configured to generate a current which is turned on and off according a control signal having the same frequency as that of the pulse signal.

With such an arrangement, the soft-off capacitor can be discharged using a pulse discharge current. Thus, such an arrangement is capable of adjusting the time constant according to the duty ratio of the control signal. Furthermore, such an arrangement is capable of reducing the duty ratio with each cycle in which the switching transistor M1 is switched on and off.

Also, the pulse modulator may further comprise: a first switch arranged between an output terminal of the error amplifier and the feedback terminal, and configured to switch on in the on period and to switch off in the off period; and a second switch arranged between an input terminal of the pulse generator and the feedback terminal, and configured to switch on in the on period and to switch off in the off period.

With such an arrangement, in the off period in which the first switch and the second switch are turned off, the feedback terminal is set to the high-impedance state, thereby maintaining the voltage at the feedback terminal. Accordingly, when the next transition occurs to the on period, such an arrangement is capable of resuming the feedback control operation with the start point voltage at the feedback terminal being the same voltage as that in the previous on period. Thus, such an arrangement reduces the period of time required to stabilize the feedback operation.

Also, the detection voltage that corresponds to the output voltage of the switching power supply may be a voltage that occurs at the other terminal of the light emitting element. Alternatively, the detection voltage may be a voltage obtained by dividing the output voltage.

Another embodiment of the present invention relates to a light emitting apparatus. The light emitting apparatus comprises: a light emitting element; a switching power supply configured to supply a driving voltage to one terminal of the light emitting element; and a current driving circuit connected to the other terminal of the light emitting element, and configured to supply an intermittent driving current that corresponds to a target luminance. The switching power supply comprises: an output circuit comprising a switching element; and a control circuit according to any one of the aforementioned embodiments, configured to drive the switching element.

Yet another embodiment of the present invention relates to an electronic device. The electronic device comprises: a liquid crystal panel; and the aforementioned light emitting apparatus arranged as a backlight of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
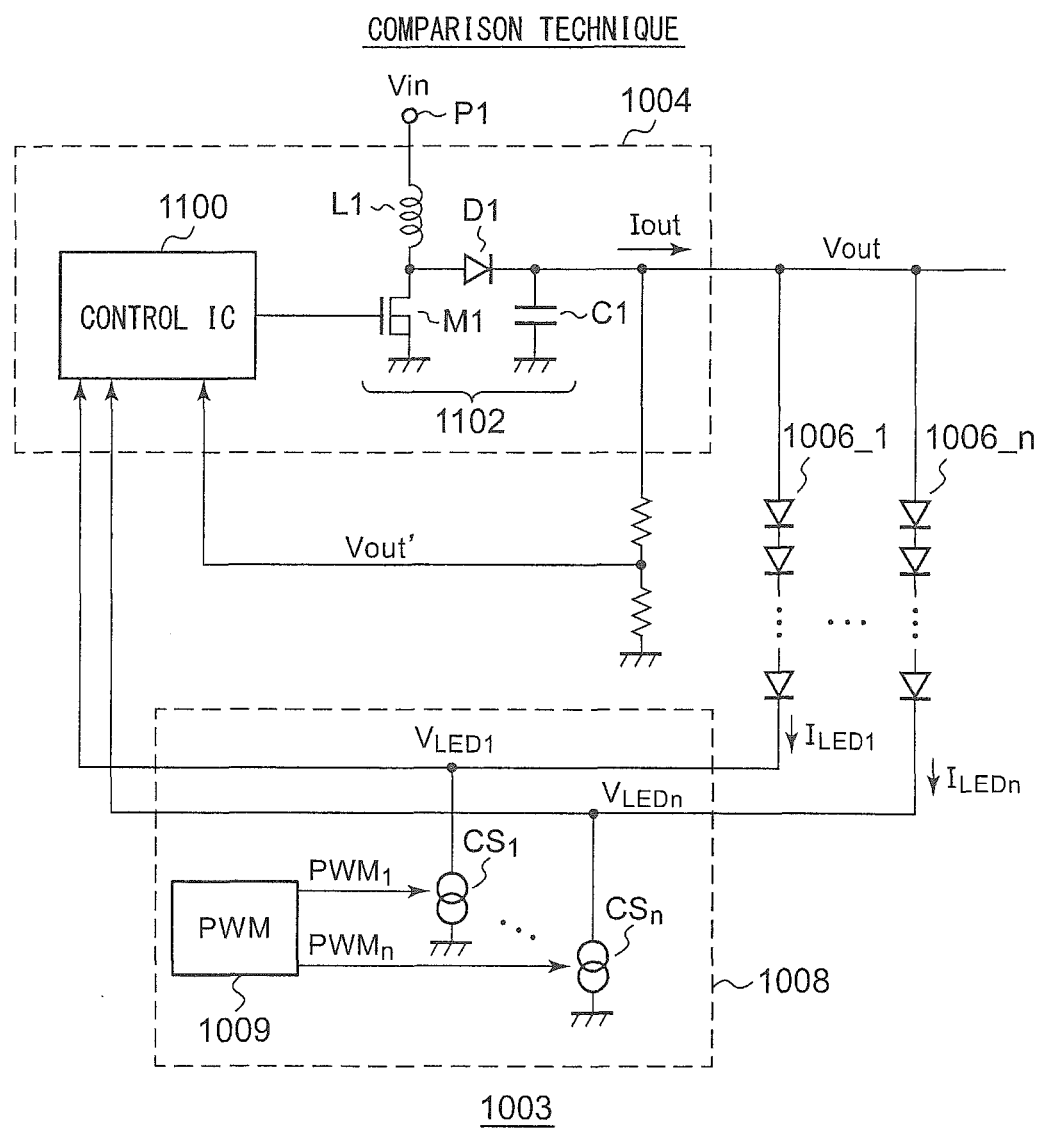
FIG. 1 is a circuit diagram which shows an example configuration of a light emitting apparatus according to a comparison technique.
Figure 2:
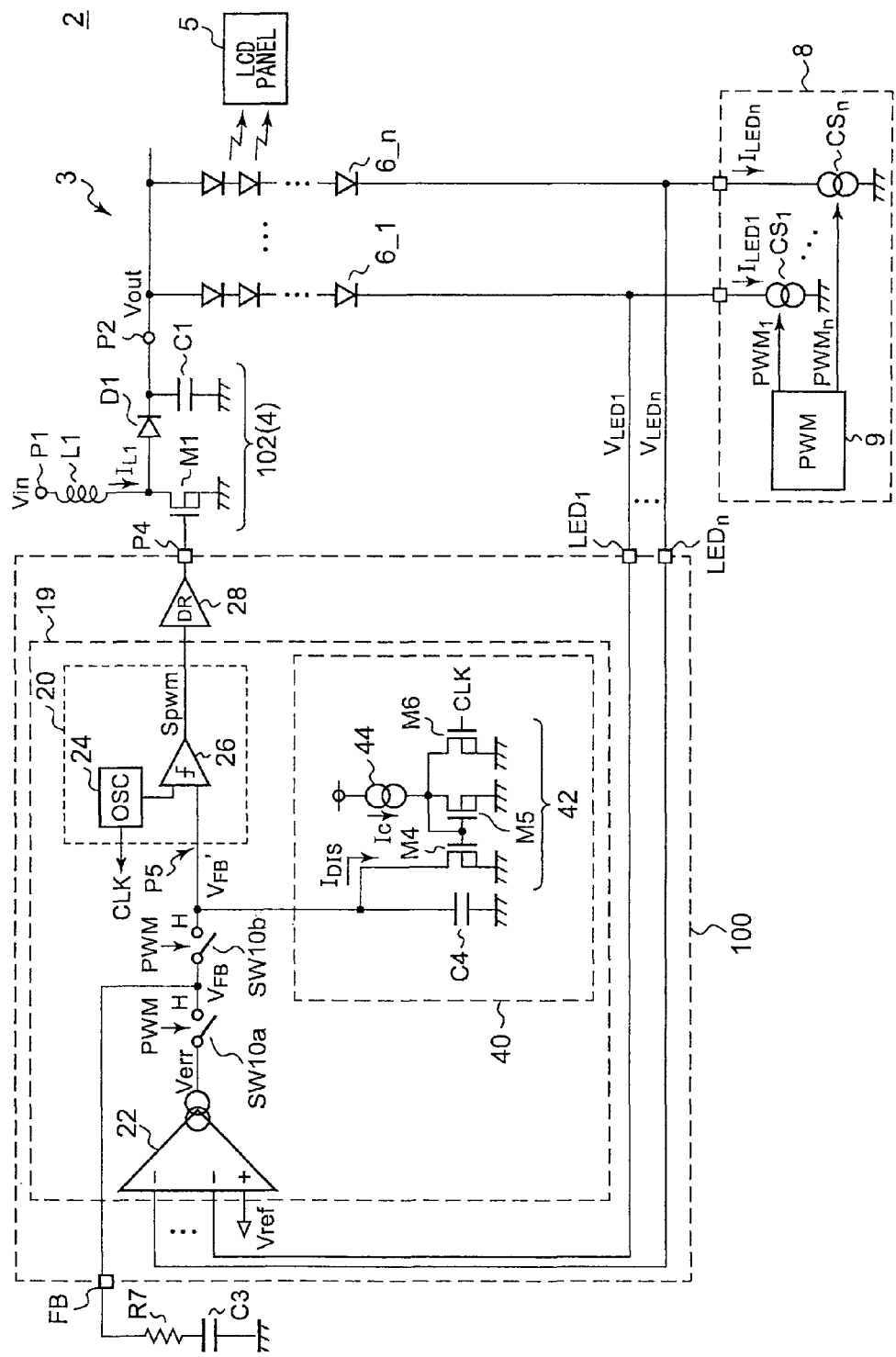
FIG. 2 is a circuit diagram which shows a configuration of an electronic device including a switching power supply according to an embodiment.

FIG. 2 is a circuit diagram which shows a configuration of an electronic device including a switching power supply according to an embodiment.

An electronic device 2 is configured as a battery-driven device such as a laptop PC, a digital still camera, a digital video camera, a cellular phone terminal, a PDA (Personal Digital Assistant), or the like. The electronic device 2 includes a light emitting apparatus 3 and an LCD (Liquid Crystal Display) panel 5. The light emitting apparatus 3 is arranged as a backlight of the LCD panel 5.

The light emitting apparatus 3 includes LED strings 6_1 through 6_n each configured as a light emitting element, a current driving circuit 8, and a switching power supply 4.

Each LED string 6 includes multiple LEDs connected in series. The switching power supply 4 is configured as a step-up DC/DC converter. The switching power supply 4 is configured to boost the input voltage (e.g., battery voltage) Vin input to an input terminal P1, and to output an output voltage (driving voltage) Vout via an output terminal P2. One terminal (anode) of each of the multiple LED strings 6_1 through 6_n is connected to the output terminal P2 so as to form a common anode terminal.

The switching power supply 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted. The present invention is not restricted to such a topology. Also, various modifications may be made with respect to such a topology, which can be understood by those skilled in this art.

A switching terminal P4 of the control IC 100 is connected to the gate of the switching transistor M1. The control IC 100 adjusts the on/off duty ratio of the switching transistor M1 by means of a feedback control operation so as to provide the output voltage Vout required to turn on the LED strings 6. It should be noted that the switching transistor M1 may be configured as a built-in component of the control IC 100.

The current driving circuit 8 is connected to the other terminal (cathode) of each of the multiple LED strings 6_1 through 6_n. The current driving circuit 8 respectively supplies, to the LED strings 6_1 through 6_n, intermittent driving currents $I_{LED1}$ through $I_{LEDn}$ that correspond to the respective target luminance levels. Specifically, the current driving circuit 8 includes multiple current sources $CS_1$ through $CS_n$ respectively provided to the LED strings 6_1 through 6_n, and a PWM controller 9. The i-th current source $CS_i$ is connected to the cathode of the corresponding i-th LED string 6_i. The current source $CS_i$ is configured to be capable of switching its state between an operating (active) state $\phi_{ON}$ in which it outputs a driving current $I_{LEDi}$ and an off state $\phi_{OFF}$ in which the supply of the driving current $I_{LEDi}$ is stopped. The PWM controller 9 generates control signals $PWM_i$ through $PWM_n$ each having a duty ratio that corresponds to the corresponding target luminance level, and outputs the control signals thus generated to the current sources $CS_1$ through $CS_n$. In a period of time (on period $T_{ON}$) in which the control signal $PWM_i$ is asserted (set to high level, for example), the corresponding current source $CS_i$ enters the operating state $\phi_{ON}$, thereby turning on the LED string $6\_i$. In a period of time (off period $T_{OFF}$) in which the control signal $PWM_i$ is negated (set to low level, for example), the corresponding current source $CS_i$ is set to the off state $\phi_{OFF}$, thereby turning off the LED string $6\_i$. By controlling the time ratio between the on period $T_{ON}$ and the off period $T_{OFF}$, such an arrangement is capable of controlling the effective value (time average) of the driving current $I_{LED}$ that flows through the LED string $6\_i$, thereby allowing the luminance level to be adjusted. The frequency of the PWM control operation of the current driving circuit 8 is on the order of several ten to several hundred Hz.

The control IC 100 and the current driving circuit 8 are integrated on separate chips. Also, such components may be configured as a single package (module) or may be configured as separate packages. Alternatively, the control IC 100 and the current driving circuit 8 may be integrated on a single chip.

The above is the overall configuration of the light emitting apparatus 3. Next, description will be made regarding the configuration of the control IC 100. The control IC 100 includes LED terminals $LED_1$ through $LED_n$ respectively provided to the LED strings $6\_1$ through $6\_n$. Each LED terminal $LED_i$ is connected to the cathode terminal of the corresponding LED string $6\_i$. It should be noted that there is not necessarily a need to provide such multiple LED strings. Also, the light emitting apparatus 3 may include a single LED string.

The control IC 100 mainly includes a pulse modulator 19 and a driver 28.

The pulse modulator 19 generates a pulse signal Spwm having a duty ratio adjusted such that a detection voltage that corresponds to the output voltage Vout matches a predetermined reference voltage Vref in the on period $T_{ON}$ of the LED strings 6. In FIG. 2, the detection voltage is the lowest of the voltages (LED terminal voltages) $V_{LED1}$ through $V_{LEDn}$ that occur at the cathode terminals of the LED strings 6, and will be represented by $V_{LED}$ hereafter. It should be noted that, in another embodiment, a different voltage, e.g., a voltage obtained by dividing the output voltage Vout may be used as the detection voltage.

The driver 28 drives the switching transistor M1 according to the pulse signal Spwm.

In the on period $T_{ON}$, the control IC 100 adjusts the output voltage Vout of the switching power supply 4 such that it has the optimum voltage level for driving the LED strings $6\_1$ through $6\_n$.

In the off period $T_{OFF}$, the driving currents $I_{LED1}$ through $I_{LEDn}$ supplied to the respective LED strings $6\_1$ through $6\_n$ become zero, i.e., the switching power supply 4 enters the no-load state. Accordingly, the control IC 100 sets the switching transistor M1 to the off state.

When the LED strings 6 transit from the on period $T_{ON}$ to the off period $T_{OFF}$, the pulse modulator 19 reduces the duty ratio of the pulse signal Spwm over time. If the off period $T_{OFF}$ is sufficiently long, the duty ratio of the pulse signal Spwm eventually becomes zero, and the switching transistor M1 is set to the off state.

Next, description will be made regarding an example configuration of the pulse modulator 19 which is capable of providing the aforementioned function.

The pulse modulator 19 includes an error amplifier 22, a pulse generator (pulse width modulator) 20, a feedback terminal (FB terminal), a soft-off circuit 40, a first switch SW10a, and a second switch SW10b.

A phase compensation capacitor C3 and a phase compensation resistor R7 are arranged between the FB terminal and an external fixed voltage terminal (ground terminal).

The error amplifier 22 is a so-called gm amplifier. In the on period of the LED strings 6, the error amplifier 22 generates a current that corresponds to the difference between the detection voltage $V_{LED}$ and the reference voltage Vref, and supplies the current thus generated to the FB terminal. A feedback voltage $V_{FB}$, which corresponds to the difference between the detection voltage $V_{LED}$ and the reference voltage Vref, occurs at the FB terminal.

Specifically, the error amplifier 22 includes multiple inverting input terminals (−) and a single non-inverting input terminal (+). The LED terminal voltages $V_{LED1}$ through $V_{LEDn}$ are input to the respective multiple inverting input terminals, and the reference voltage Vref is input to the non-inverting input terminal. The error amplifier 22 outputs a current that corresponds to the difference between the lowest LED terminal voltage (detection voltage) $V_{LED}$ and the reference voltage Vref.

The first switch SW10a is arranged between the output terminal of the error amplifier 22 and the FB terminal. The second switch SW10b is arranged between the input terminal P5 of the pulse width modulator 20 and the FB terminal. The first switch SW10a and the second switch SW10b are turned on in the on period $T_{ON}$, and are turned off in the off period $T_{OFF}$.

The pulse generator 20 is configured as a pulse width modulator, for example, and is configured to receive the voltage $V_{FB}$ that occurs at the FB terminal, and to generate a pulse signal Spwm having a duty ratio that corresponds to the voltage $V_{FB}$ thus received. Specifically, as the feedback voltage $V_{FB}$ becomes higher, the duty ratio of the pulse signal Spwm becomes larger.

The pulse width modulator 20 includes an oscillator 24 and a PWM comparator 26. The oscillator 24 generates a cyclic voltage $V_{OSC}$ having a triangle waveform or a sawtooth waveform. Furthermore, the oscillator 24 outputs a control clock signal CLK that is in synchronization with the cyclic voltage $V_{OSC}$. The high level (low level) period of the control clock signal CLK is preferably adjustable.

The PWM comparator 26 compares the feedback voltage $V_{FB}$ with the cyclic voltage $V_{OSC}$, and generates the PWM signal Spwm having a level that corresponds to the comparison result. It should be noted that a pulse frequency modulator or the like may be employed as the pulse generator 20. The frequency of the PWM signal Spwm is sufficiently higher than that of the PWM driving operation of the current driving circuit 8. Specifically, the frequency of the PWM signal Spwm is on the order of several hundred kHz (e.g., 600 kHz).

When transition occurs from the on period $T_{ON}$ to the off period $T_{OFF}$, the soft-off circuit 40 changes the voltage $V_{FB}'$ to be input to the pulse width modulator 20 over time, such that the duty ratio of the pulse signal Spwm is reduced over time. Specifically, the soft-off circuit 40 reduces the voltage $V_{FB}'$ over time.

The soft-off circuit 40 includes a soft-off capacitor C4 and a discharge circuit 42. The soft-off capacitor C4 is arranged between the input terminal P5 of the pulse width modulator 20 and a fixed voltage terminal (ground terminal). In the on period $T_{ON}$, the soft-off capacitor C4 is charged by the voltage $V_{FB}$ at the FB terminal. That is to say, in the on period $T_{ON}$, the voltage $V_{FB}'$ input to the pulse modulator 19 is equal to the voltage $V_{FB}$ at the FB terminal.

In the off period $T_{OFF}$, the discharge circuit 42 discharges the soft-off capacitor C4. Thus, the voltage $V_{FB}'$ to be input to the pulse width modulator 20 is reduced over time. The discharge circuit 42 generates a discharge current $I_{DIS}$ which is turned on and off according to a control signal CLK having the same frequency as that of the pulse signal $S_{PWM}$, which is drawn from the soft-off capacitor C4.

The discharge circuit 42 includes a current source 44 and transistors M4 through M6. The current source 44 generates a constant current Ic. The transistors M4 and M5 form a current mirror circuit, which is configured to duplicate the constant current Ic with a mirror ratio K, thereby generating the discharge current $I_{DIS}=K\times Ic$. The switch M6 is arranged between the gate and the source of the transistor M5. The control clock signal CLK is input to the gate of the switch M6. When the control clock signal CLK is high level, the switch M6 is turned on. In this state, the transistors M4 and M5 are turned off, and the discharge current $I_{DIS}$ thus becomes zero. When the control clock signal CLK is low level, the switch M6 is turned off, whereby the discharge current $I_{DIS}$ flows.

The above is the configuration of the control IC 100.

Figure 3:
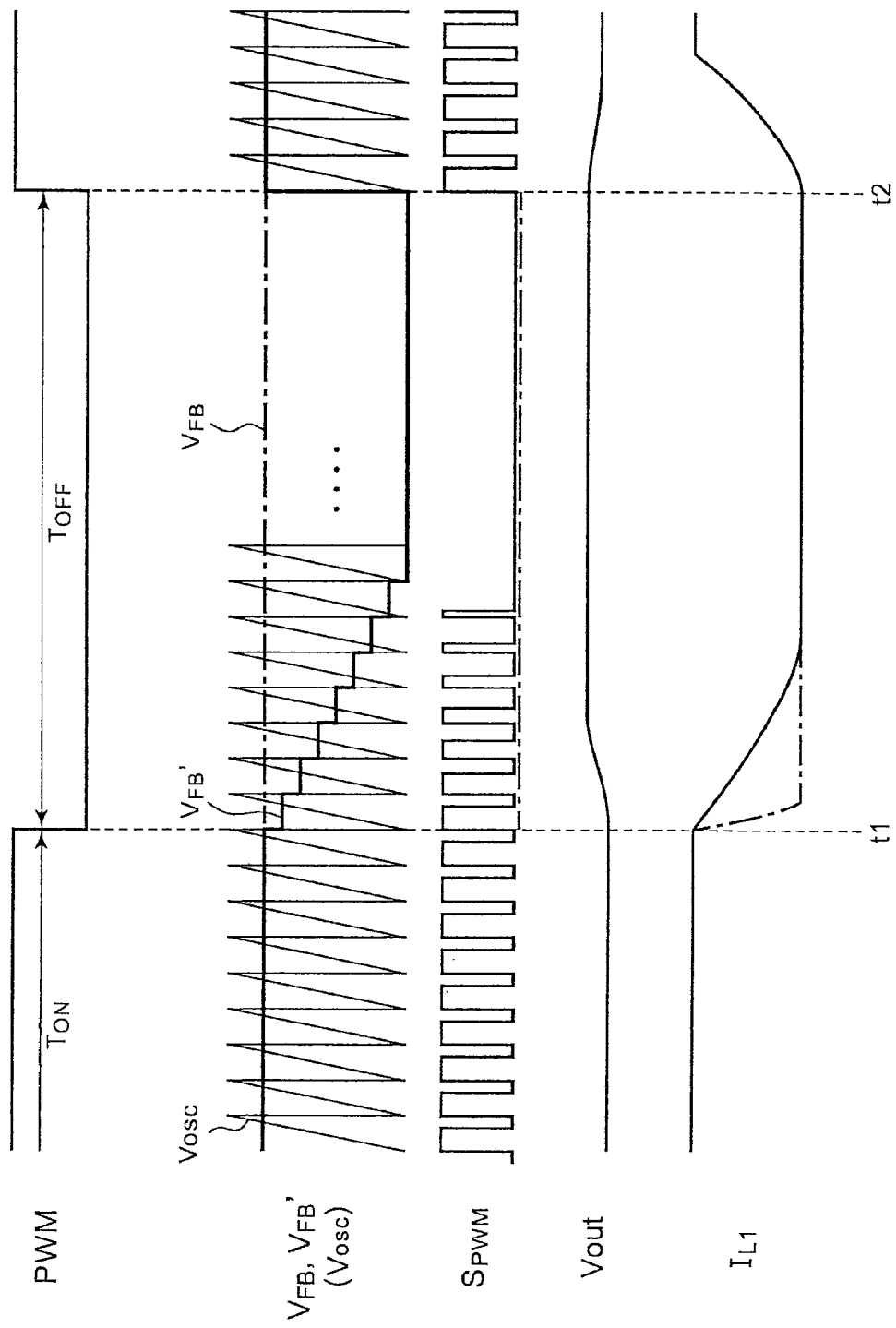
FIG. 3 is a waveform diagram which shows the operation of the light emitting apparatus shown in FIG. 2.

Next, description will be made regarding the operation of the light emitting apparatus 3. FIG. 3 is a waveform diagram which shows the operation of the light emitting apparatus 3 shown in FIG. 2. From the top and in the following order, FIG. 3 shows the control signal PWM, the feedback voltage $V_{FB}$ (line of dashes and dots), the input voltage $V_{FB}'$ of the pulse modulator 19 (solid line), the pulse signal Spwm (solid line), the output voltage Vout, and the coil current $I_{L1}$ (solid line). The vertical axis and the horizontal axis shown in the waveform diagrams and time charts in the present specification are expanded or reduced as appropriate for ease of understanding. Also, each waveform shown in the drawings is simplified for ease of understanding.

In the on period $T_{ON}$ before the time point t1, the output voltage Vout is stabilized so as to satisfy the relation Vout=$V_{LED}$+Vf. Vf represents the voltage drop that occurs at the LED string 6 in a state in which the driving current $I_{LED}$ flows.

At the time point t1, the pulse signal PWM is switched from high level to low level, whereby transition occurs from the on period $T_{ON}$ to the off period $T_{OFF}$. At this timing, the first switch SW10a and the second switch SW10b are turned off, and thus, the voltage $V_{FB}$ at the FB terminal is maintained at a constant voltage.

When the off period $T_{OFF}$ is initiated, the soft-off circuit 40 reduces the input voltage $V_{FB}'$ of the pulse modulator 19 over time. This gradually reduces the duty ratio of the PWM signal Spwm, thereby gradually reducing the coil current $I_{L1}$.

As described above, the soft-off circuit 40 reduces the voltage $V_{FB}'$ in synchronization with the PWM signal Spwm. Thus, such an arrangement is capable of gradually reducing the duty ratio of the PWM signal Spwm with each cycle. Furthermore, the amount of change in the duty ratio of the PWM signal Spwm can be adjusted according to the constant current It and the duty ratio of the control clock signal CLK.

Immediately after transition to the off period $T_{OFF}$, there is a slight rise in the output voltage Vout. This is because there is a slight flow of the coil current $I_{L1}$ when the switching power supply 4 is in the no-load state.

When the duty ratio of the PWM signal Spwm becomes zero in the off period $T_{OFF}$, the switching operation of the switching transistor M1 stops.

When the pulse signal PWM transits from the low-level state to the high-level state at the time point t2, the period becomes the on period $T_{ON}$. At this timing, the first switch SW10a and the second switch SW10b are turned on, thereby returning the input voltage $V_{FB}'$ of the pulse modulator 19 to a level that is the same as that of the voltage $V_{FB}$ at the FB terminal. As a result, the switching operation of the switching transistor M1 is resumed with the pulse signal Spwm having a duty ratio that is approximately the same as that used in the previous on period $T_{ON}$.

The above is the operation of the light emitting apparatus 3.

FIG. 3 is a waveform diagram showing the waveforms obtained with a conventional circuit, which are represented by the lines of dashes and dots. With conventional techniques, the PWM signal Spwm is fixed to low level immediately after transition to the off period $T_{OFF}$, thereby immediately stopping the switching operation of the switching transistor M1. This leads to a sudden decrease in the coil current $I_{L1}$, which becomes a cause of acoustic noise.

In contrast, with the light emitting apparatus 3 according to the embodiment, by gradually reducing the coil current $I_{L1}$ in the off period $T_{OFF}$, such an arrangement is capable of reducing acoustic noise that occurs in the inductor L1.

Description has been made regarding the prevent invention with reference to the embodiments. The above-described embodiments have been described for exemplary purposes only, and are by no means intended to be interpreted restrictively. Rather, various modifications may be made by making various combinations of the aforementioned components or processes. Description will be made below regarding such modifications.

Description has been made in the embodiment regarding a non-isolated switching power supply employing an inductor. Also, the present invention can be applied to an isolated switching power supply employing a transformer.

Description has been made in the embodiment regarding an electronic device as an application of the light emitting apparatus 3. However, the application of the light emitting apparatus 3 is not restricted in particular. Also, the light emitting apparatus 3 can be applied to an illumination device and so forth.

Description has been made in the embodiment regarding an arrangement in which the soft-off capacitor C4 is discharged using the pulse current $I_{DIS}$. Also, the soft-off capacitor C4 may be discharged using a continuous current $I_{DIS}$.

The settings of the logical signals, such as the high-level state and the low-level state of the signals, have been described in the present embodiment for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a switching power supply configured to supply a driving voltage to one terminal of a light emitting element to be intermittently driven, the control circuit comprising:
    a pulse modulator configured to generate a pulse signal having a duty ratio adjusted such that a detection voltage that corresponds to an output voltage of the switching power supply matches a predetermined reference voltage in an on period of the light emitting element; and
    a driver configured to drive a switching element included in the switching power supply, according to the pulse signal, wherein, after transition of the light emitting element from the on period to an off period, the pulse modulator gradually reduces the duty ratio of the pulse signal over time, and wherein
(i) in the on period, the driver drives the switching element according to the pulse signal such that the detection voltage matches the predetermined reference voltage, and (ii) in the off period, the driver drives the switching element according to the pulse signal having a reduced duty ratio, and wherein the pulse modulator comprises:
a feedback terminal via which a phase compensation capacitor and a phase compensation resistor are to be connected;
an error amplifier configured to generate a current that corresponds to a difference between the detection voltage and the reference voltage and to supply the current thus generated to the feedback terminal, in the on period of the light emitting element;
a pulse generator configured to receive a feedback voltage that occurs at the feedback terminal, and to generate a pulse signal having a duty ratio that corresponds to the feedback voltage;
a soft-off circuit configured to change the feedback voltage gradually such that the duty ratio of the pulse signal is gradually reduced after transition of the light emitting element from the on period to the off period;
a first switch arranged between an output terminal of the error amplifier and the feedback terminal, and configured to switch on in the on period and to switch off in the off period; and
a second switch arranged between an input terminal of the pulse generator and the feedback terminal, and configured to switch on in the on period and to switch off in the off period.

2. A control circuit according to claim 1, wherein the soft-off circuit comprises:
a soft-off capacitor arranged between an input terminal of the pulse generator and a fixed voltage terminal, and configured to be charged by a voltage that occurs at the feedback terminal in the on period; and
a discharge circuit configured to discharge the soft-off capacitor in the off period.

3. A control circuit according to claim 2, wherein the discharge circuit is configured to generate a current which is turned on and off according a control signal having the same frequency as that of the pulse signal.

4. A control circuit according to claim 1, wherein the detection voltage that corresponds to the output voltage of the switching power supply is a voltage that occurs at another terminal of the light emitting element.

5. A light emitting apparatus comprising:
a light emitting element;
a switching power supply configured to supply a driving voltage to one terminal of the light emitting element; and
a current driving circuit connected to another terminal of the light emitting element, and configured to supply an intermittent driving current that corresponds to a target luminance,
wherein the switching power supply comprises:
an output circuit comprising a switching element; and
a control circuit configured to drive the switching element, wherein
the control circuit comprises:
a pulse modulator configured to generate a pulse signal having a duty ratio adjusted such that a detection voltage that corresponds to an output voltage of the switching power supply matches a predetermined reference voltage in an on period of the light emitting element; and
a driver configured to drive a switching element included in the switching power supply, according to the pulse signal,
wherein, after transition of the light emitting element from the on period to an off period, the pulse modulator gradually reduces the duty ratio of the pulse signal over time, and wherein
(i) in the on period, the driver drives the switching element according to the pulse signal such that the detection voltage matches the predetermined reference voltage, and (ii) in the off period, the driver drives the switching element according to the pulse signal having a reduced duty ratio, and wherein the pulse modulator comprises:
a feedback terminal via which a phase compensation capacitor and a phase compensation resistor are to be connected;
an error amplifier configured to generate a current that corresponds to a difference between the detection voltage and the reference voltage, and to supply the current thus generated to the feedback terminal, in the on period of the light emitting element;
a pulse generator configured to receive a feedback voltage that occurs at the feedback terminal, and to generate a pulse signal having a duty ratio that corresponds to the feedback voltage;
a soft-off circuit configured to change the feedback voltage gradually such that the duty ratio of the pulse signal is gradually reduced after transition of the light emitting element from the on period to the off period;
a first switch arranged between an output terminal of the error amplifier and the feedback terminal and configured to switch on in the on period and to switch off in the off period; and
a second switch arranged between an input terminal of the pulse generator and the feedback terminal, and configured to switch on in the on period and to switch off in the off period.

6. An electronic device comprising:
a liquid crystal panel; and
a light emitting apparatus as a backlight of the liquid crystal panel, wherein the light emitting apparatus comprises:
a light emitting element;
a switching power supply configured to supply a driving voltage to one terminal of the light emitting element; and
a current driving circuit connected to the other terminal of the light emitting element, and configured to supply an intermittent driving current that corresponds to a target luminance,
wherein the switching power supply comprises:
an output circuit comprising a switching element; and
a control circuit configured to drive the switching element, wherein
the control circuit comprises:
a pulse modulator configured to generate a pulse signal having a duty ratio adjusted such that a detection voltage that corresponds to an output voltage of the switching power supply matches a predetermined reference voltage in an on period of the light emitting element; and
a driver configured to drive a switching element included in the switching power supply, according to the pulse signal, wherein, after transition of the light emitting element from the on period to an off period, the pulse modulator gradually reduces the duty ratio of the pulse signal over time, and wherein
(i) in the on period, the driver drives the switching element according to the pulse signal such that the detection voltage matches the predetermined reference voltage, and (ii) in the off period, the driver drives the switching element according to the pulse signal having a reduced duty ratio, and wherein the pulse modulator comprises:

a feedback terminal via which a phase compensation capacitor and a phase compensation resistor are to be connected;

an error amplifier configured to generate a current that corresponds to a difference between the detection voltage and the reference voltage, and to supply the current thus generated to the feedback terminal, in the on period of the light emitting element;

a pulse generator configured to receive a feedback voltage that occurs at the feedback terminal, and to generate a pulse signal having a duty ratio that corresponds to the feedback voltage;

a soft-off circuit configured to change the feedback voltage gradually such that the duty ratio of the pulse signal is gradually reduced after transition of the light emitting element from the on period to the off period;

a first switch arranged between an output terminal of the error amplifier and the feedback terminal and configured to switch on in the on period and to switch off in the off period; and a second switch arranged between an input terminal of the pulse generator and the feedback terminal, and configured to switch on in the on period and to switch off in the off period.

* * * * *